United States Patent [19]

Hirano

[11] Patent Number: 5,698,796

[45] Date of Patent: Dec. 16, 1997

[54] BELT TENSION MEASURING APPARATUS

[75] Inventor: Shigeaki Hirano, Tokyo, Japan

[73] Assignee: Mitsubishi Denki Kabushiki Kaisha, Tokyo, Japan

[21] Appl. No.: 615,463

[22] Filed: Mar. 14, 1996

[30] Foreign Application Priority Data

Jun. 5, 1995 [JP] Japan ................... 7-138088

[51] Int. Cl.$^6$ ................... G01L 5/00
[52] U.S. Cl. ................... 73/862.41; 73/160
[58] Field of Search ................... 73/862.391, 862.41, 73/862.42, 862.43, 862.44, 862.451, 862.452, 862.453, 862.454, 862.46, 862.471, 862.472, 862.473, 862.474, 160

[56] References Cited

U.S. PATENT DOCUMENTS

| 3,854,329 | 12/1974 | Jones | 73/862.41 |
| 4,109,520 | 8/1978 | Eriksson | 73/862.41 |
| 4,655,093 | 4/1987 | Strom et al. | 73/862.41 |

FOREIGN PATENT DOCUMENTS

| 0100394 | 2/1984 | European Pat. Off. . |
| 0479120 | 4/1992 | European Pat. Off. . |
| 3081633 | 4/1991 | Japan . |
| 6137932 | 5/1994 | Japan . |

OTHER PUBLICATIONS

International Publication No. WO 87/05699, Sep. 24, 1987.

*Primary Examiner*—Ronald L. Biegel
*Attorney, Agent, or Firm*—Sughrue, Mion, Zinn, Macpeak & Seas, PLLC

[57] ABSTRACT

Apparatus and method for measuring a tension of a belt in a state spanned between pulleys under tension. Vibration is applied to the belt with a frequency varying within a predetermined frequency range including a resonance vibration frequency of the belt. Amplitude of vibration of the belt is detected to thereby output a corresponding amplitude signal. Occurrence of resonance of the belt is determined on the basis of a steep change of the amplitude signal. The vibration frequency of the belt detected upon occurrence of the resonance is identified as a resonance vibration frequency of the belt. Tension of the belt is determined on the basis of the resonance vibration frequency.

22 Claims, 2 Drawing Sheets

BELT TENSION MEASURING APPARATUS

BACKGROUND OF THE INVENTION

1. Field of the Invention

The present invention relates to a belt tension measuring apparatus for measuring a tension of a belt in a state spanned under tension. More particularly, the invention is concerned with a belt tension measuring apparatus for measuring tension of a belt spanning pulleys of an internal combustion engine for a motor vehicle.

2. Description of Related Art

For having better understanding of the present invention, description will first be made in some detail of the background techniques thereof. FIG. 4 is a schematic diagram for illustrating a conventional method known heretofore for measuring a tension of a belt spanning pulleys of an internal combustion engine of a motor vehicle. Referring to the figure, pulleys 1 and 2 are spanned with a belt 3. For measuring a tension of the belt 3, it is pushed downwardly under a predetermined pressure applied by means of a pressure gauge (or manometer) 4 disposed so as to bear against the belt 3 at a predetermined position thereof, whereby the belt 3 is deflected downwardly by a predetermined distance (i.e., by a deflection $\Delta L$). The pressure applied to the belt 3 is monitored by using the pressure gauge 4 itself.

Now, the belt tension measuring method will be elucidated. For measuring a tension of the belt 3 spanning the pulleys 1 and 2 equipped for an internal combustion engine of a motor vehicle (not shown), the pressure gauge 4 is pressed against the belt 3 at a mid or center position thereof under a preset pressure (e.g. 10 g). In this state, it is visually observed with the aid of a linear scale incorporated in the pressure gauge 4 whether the belt 3 is deflected by a predetermined magnitude $\Delta L$ (e.g. 10 mm) from the normal state under the influence of a pressure applied by the pressure gauge 4. Subsequently, a tension T of the belt 3 is estimated in accordance with an expression defining a relation between the tension T of the belt 3 and the deflection $\Delta L$, which expression has previously been determined experimentally by a bench test or the like process.

Further, there is also known a belt tension measuring method for measuring a tension of the belt 3 on the basis of a vibration frequency in the state in which the belt 3 is caused to vibrate at a resonance vibration frequency (also known as the characteristic vibration frequency or the proper vibration frequency), as is illustrated in FIG. 5. More specifically, the belt 3 spanned between the pulleys 1 and 2 is caused to vibrate freely at a resonance vibration frequency thereof under a vibration exciting force applied thereto by means of a hammer member 6 having a mass m. The vibration of the belt 3 vibrating freely at the resonance vibration frequency is picked up by a transducer 9 which may constituted by a microphone or the like disposed in opposition to the direction of vibration of the belt 3. The output signal of the transducer 9 is inputted to a frequency meter 20 for detecting the vibration frequency to thereby display the resonance vibration frequency of the belt 3 in terms of a frequency.

As can be seen in FIG. 5, the hammer member 6 for vibrating the belt 3 is fixedly secured to a lever L at one end thereof, which lever is supported by a fulcrum member 8 at a center position thereof, wherein a point of force application designated by a numeral 7 is defined at the other end of the lever L for applying a vibration exciting force to the hammer member 6.

Now, the concept of the belt tension measuring underlying the apparatus shown in FIG. 5 will be elucidated. It is known that a relation given by the undermentioned expression (1) applies valid between the tension T of the belt 3 and the resonance vibration frequency f of the belt 3 spanning the pulleys 1 and 2 in general, not being limited to the pulley spanning belt for the motor vehicle.

$$T = K \cdot S^2 \times M \times f^2 \qquad (1)$$

where

K represents a constant,

S represents an inter-pulley span (distance between pulleys),

M represents a unit weight or mass of the belt, and f represents the resonance vibration frequency of the belt.

As is apparent from the above expression (1), it is possible to estimate the tension T of the belt 3 by measuring the resonance vibration frequency f of the belt 3 provided that the span S between the pulleys 1 and 2, the unit weight or mass M of the belt and the constant K are known. For causing the belt 3 to vibrate freely, an exciting force is applied to the point of force application (7) of the lever L. Then, the lever L is once more moved upwardly around the fulcrum member 8 and then swings downwardly, whereby the hammer member 6 secured to the lever L at the free end thereof strikes the belt 3 to thereby apply a vibration exciting force to the belt 3.

As a result, the belt 3 is forced to vibrate at a resonance vibration frequency, which vibration is picked up by the transducer 9 such as a microphone in terms of a change in the sound pressure, which is then inputted to the frequency meter 20. Thus, on the basis of the output signal of the transducer 9, the frequency meter 20 detects the vibration frequency as the resonance vibration frequency f of the belt 3. The resonance vibration frequency f is then inputted to a conventional fault diagnosing tester (not shown) for the motor vehicle, whereby the tension T of the belt 3 is arithmetically determined in accordance with the expression (1) mentioned previously.

As can be appreciated from the foregoing, the first mentioned conventional belt tension measuring method which is adapted to measure visually the deflection of the belt as brought about upon application of a predetermined pressure or shock to the belt and estimate the tension of the belt on the basis of the result of the visual observation of deflection of the belt is disadvantageous in that the tension of the belt can not accurately or precisely be measured because of inevitable error involved in the measurement of the pressure or the deflection ($\Delta L$). More specifically, since it is difficult to hold the pressure gauge stably against the belt, the measurement is prone to be accompanied with error. In brief, this conventional method is not suited for measuring the tension of the belt with reasonable accuracy.

On the other hand, the second mentioned method of making the belt vibrate freely at the resonance vibration frequency by striking the belt by the hammer member suffers from problems that the vibration waveform is distorted in dependence on the manner for striking the belt, that the vibration waveform becomes unstable in dependence on location at which the vibration exciting force is applied and that the duration of the free vibration varies as a function of magnitude of the vibration exciting force, which presents difficulty in accurate measurement of the resonance vibration frequency. Under the circumferences, a vibration exciting mechanism has been developed for applying mechanically a vibration exciting force to the belt in place of manual application of the exciting force, which however encounters a great difficulty in installing the vibration exciting mechanism in association with the belt because a space available therefor is usually much limited in particular in the internal combustion engine for a motor vehicle.

SUMMARY OF THE INVENTION

In the light of the state of the art described above, it is an object of the present invention to provide a method and an improved belt tension measuring apparatus which can successfully overcome the aforementioned problems of the conventional belt tension measuring apparatuses.

In view of the above and other objects which will become apparent as the description proceeds, there is provided according to a general aspect of the present invention an apparatus for measuring a tension of a belt in a state spanned under tension, which apparatus includes a vibration applying means for applying vibration to the belt with a frequency varying within a predetermined frequency range covering a resonance vibration frequency of the belt, a vibration amplitude detecting means for detecting amplitude of vibration of the belt to thereby output a corresponding amplitude signal, and a tension determining means for detecting occurrence of resonance of the belt on the basis of the output signal of the vibration amplitude detecting means and identifying a vibration frequency of the belt detected upon occurrence of the resonance as a resonance vibration frequency of the belt, for thereby determining the tension of the belt on the basis of the resonance vibration frequency.

In a preferred mode for carrying out the invention, the tension of the belt may be determined on the basis of the resonance vibration frequency in accordance with:

$$T = K \cdot S^2 \times M \times f^2$$

where

K represents a constant,

S represents a span length of the belt,

M represents a unit weight or mass of the belt, and f represents the resonance vibration frequency of the belt.

By virtue of the arrangement that the vibration exciting force is applied to the belt with the vibration frequency being changed continuously, as described above, the resonance vibration frequency of the belt and hence the tension thereof can be measured with high accuracy and reliability, because the result of the measurement is not affected by the manner for applying the exciting force to the belt manually or mechanically.

In another preferred mode for carrying out the invention, the belt tension measuring apparatus may be so arranged that the vibration applying means includes a signal generating means for generating an oscillation signal while sweeping frequency of the oscillation signal within the predetermined frequency range and a vibration exciting means driven by the oscillation signal generated by the signal generating means to thereby apply vibration of a frequency varying continuously within the predetermined frequency range to the belt spanned between pulleys. The tension determining means detects occurrence of the resonance of the belt when the amplitude signal changes steeply.

With the arrangement of the belt tension measuring apparatus described above, measurement of the tension of the belt can be carried out fully automatically because of the possibility of electrical/electronic implementation of the apparatus, whereby the result of the measurement can be obtained stably with high reproducibility without dispersion or variance from one to another measurement.

In yet another preferred mode for carrying out the invention, the tension determining means may be so arranged as to identify as the resonance vibration frequency of the belt a frequency of the oscillation signal outputted from the signal generating means at a time point when the amplitude signal changes steeply.

With the arrangement described above, the resonance vibration frequency of the belt can easily be detected with high reliability by adopting a feedback technique which per se is known in the art.

In still another preferred mode for carrying out the invention, the vibration applying means may be so arranged that it includes a transducer for converting the electrical oscillation signal outputted from the signal generating means into mechanical vibration of a frequency corresponding to that of the oscillation signal, the mechanical vibration being applied to the belt by a vibration transmitting member which is disposed in physical contact with the belt.

By virtue of the arrangement described above, the resonance vibration frequency of the belt can be measured consistently with improved reproducibility, because of capability of measuring the vibration amplitude of the belt with high accuracy owing to the positive transmission of the vibration exciting force by the vibration transmitting member.

In a further preferred mode for carrying out the invention, the vibration applying means may be so arranged as to include a transducer for converting the oscillation signal outputted from the signal generating means into mechanical vibration having a frequency corresponding to that of the oscillation signal, the mechanical vibration being applied to the belt by a vibration transmission member which is not in physical contact with the belt.

By applying the mechanical vibration to the belt in the contactless manner as described above, accuracy of measurement of the vibration amplitude of the belt and hence the resonance vibration frequency and the tension thereof can be enhanced significantly because the inertial mass of the vibration transmission member exerts essentially no influence to the belt.

In a yet further preferred mode for carrying out the invention, the vibration transmission member may be comprised of a pressure sensor serving as the vibration amplitude detecting means.

Because of interposition of the pressure sensor which serves additionally as the mechanical vibration transmitting member, the structure of the control apparatus can be simplified.

In a still further preferred mode for carrying out the invention, the vibration amplitude detecting means may be arranged such that it includes a pressure sensor element which is positioned in contact with the belt.

By positioning the pressure sensor element in contact with the belt as mentioned above, the vibration amplitude of the belt can be detected with high reliability even when the vibration exciting force applied to the belt is of a small magnitude, which in turn means that the belt tension measuring apparatus can be manufactured inexpensively.

In another preferred mode for carrying out the invention, the vibration Amplitude detecting means may be so arranged as to include a sensor element which is not positioned in contact with the belt.

With the above arrangement, the vibration amplitude and frequency of the belt can be measured with improved accuracy because the mass of the sensor element exerts no influence to the vibration behavior of the belt.

In yet another preferred mode for carrying out the invention, the sensor element may be comprised of a vibration acceleration sensor clamped to the belt for detecting acceleration of vibration of the belt.

With the above arrangement, change of the vibration amplitude of the belt can be measured as steep change of an acceleration signal outputted from the vibration acceleration sensor element, whereby the resonance vibration frequency can be detected rapidly. In that case, however, the mass of the acceleration sensor should be made as low as possible so that the vibration behavior of the belt is not affected by the sensor element.

In still another preferred mode for carrying out the invention, the vibration exciting means may be comprised of pneumatic means for applying air streams to the belt at a predetermined time interval periodically with a variable frequency.

Because of contactless application of the vibration exciting force to the belt, measurement of the vibration amplitude of the belt and hence the resonance vibration frequency as well as tension thereof can be performed with high accuracy.

Further, the output signal of the vibration amplitude detecting means may be fed back to the vibration applying means for maintaining the vibration of the belt to be constant at the resonance frequency.

By maintaining the belt at the resonance frequency for a desired period as mentioned above, reliability as well as accuracy of measurement of the resonance vibration frequency of the belt and hence the tension thereof can further be enhanced.

The invention is also directed to a method of measuring a tension of a belt in a spanned state.

Thus, according to a second aspect of the invention, there is provided a method of measuring a tension of a belt in a state spanned under tension, which method includes the steps of applying a vibration to the belt with a frequency varying within a predetermined frequency range which covers a resonance vibration frequency of the belt, detecting amplitude of vibration of the belt to thereby output a corresponding amplitude signal, and detecting occurrence of resonance of the belt on the basis of the detected amplitude and identifying a vibration frequency of the belt detected upon occurrence of the resonance as a resonance vibration frequency of the belt, for thereby determining the tension of the belt on the basis of the resonance vibration frequency.

In the belt tension measuring method described above, the tension of the belt is determined on the basis of the resonance vibration frequency in accordance with:

$$T = K \cdot S^2 \times M \times f^2$$

where

K represents a constant,

S represents a span length of the belt,

M represents a unit weight or mass of the belt, and f represents the resonance vibration frequency of the belt.

It will be appreciated without need for repetition of description that with the methods described above, advantageous effects such as mentioned previously can be achieved.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
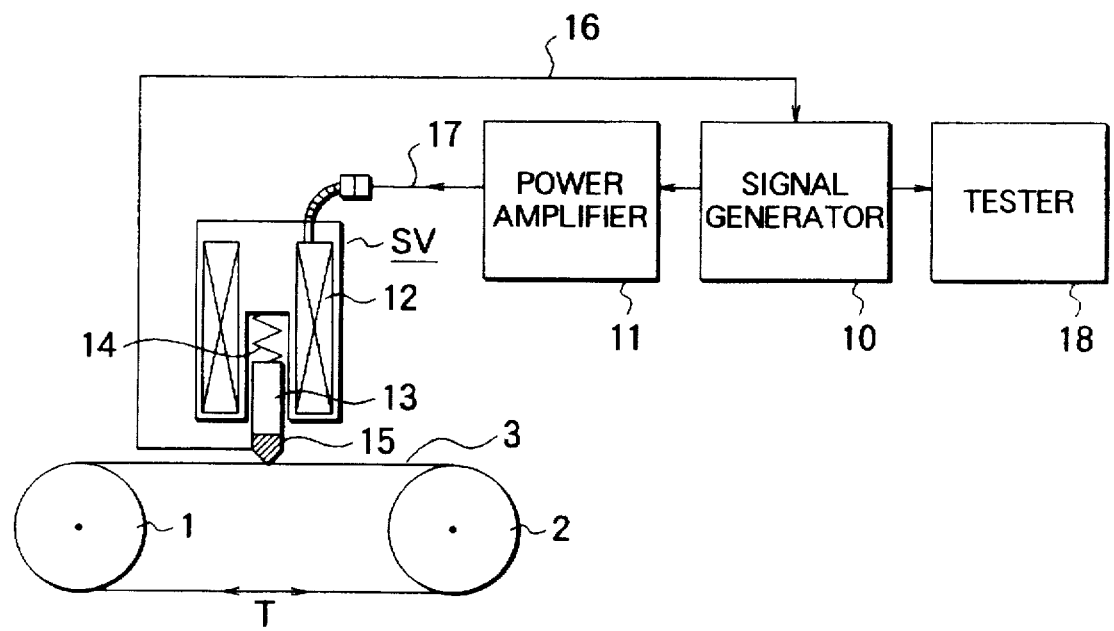
FIG. 1 is a schematic diagram showing a general arrangement of a belt tension measuring apparatus according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 2:
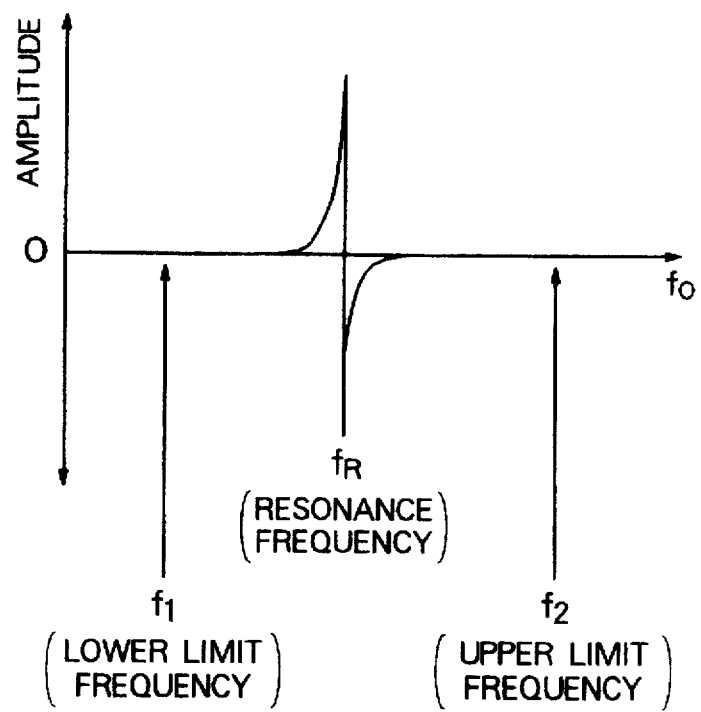
FIG. 2 is a characteristic diagram for illustrating graphically a characteristic relation between an amplitude and a frequency of a belt within a predetermined frequency range covering a resonance vibration frequency of the belt.
Figure 4:
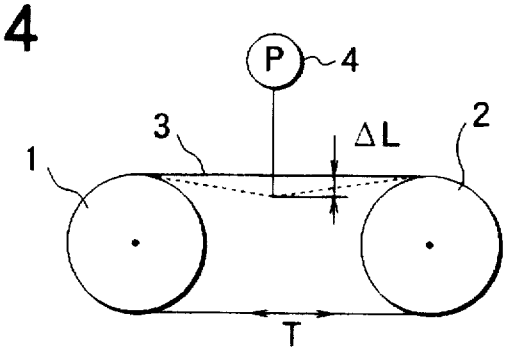
FIG. 4 is a schematic diagram for illustrating a conventional method known heretofore for measuring a tension of a belt spanning pulleys of an internal combustion engine of a motor vehicle.
Figure 5:
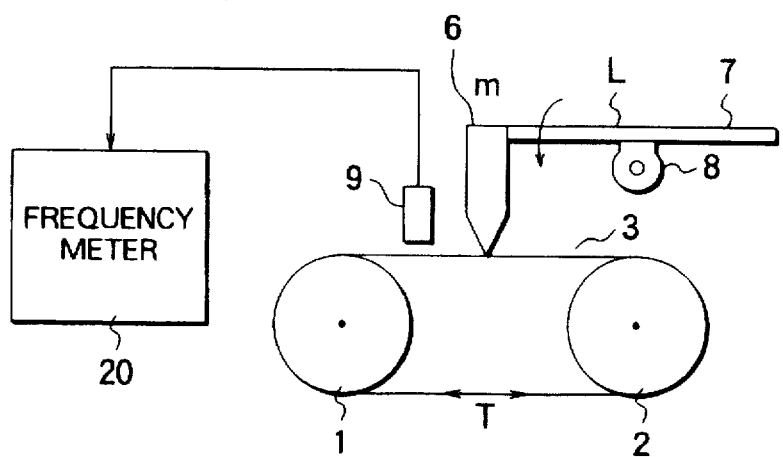
FIG. 5 is a schematic diagram for illustrating another conventional method of measuring a tension of a belt spanning pulleys of an internal combustion engine of a motor vehicle.

FIG. 1 is a schematic diagram showing a general arrangement of a belt tension measuring apparatus according to a first embodiment of the present invention, wherein like reference symbols as those used in FIG. 4 denote like or equivalent components. Referring to FIG. 1, a signal generator 10 constituting a signal generating means is designed to oscillate continuously for generating an oscillation signal having a frequency swept (i.e, varied or changed continuously) within a frequency range from $f_1$ to $f_2$, as shown in FIG. 2, whereby an oscillation signal for exciting a belt 3 with a continuously variable frequency (referred to as the vibration exciting frequency) is obtained to be subsequently amplified by a power amplifier 11.

The amplified frequency signal outputted from the power amplifier 11 is applied to an electromagnetic solenoid-type transducer SV constituting an vibration applying mechanism via a harness 17 to be thereby converted to a vibration exciting force for exciting vibration of the belt 3. The solenoid-type transducer SV is comprised of a solenoid coil 12 adapted to be alternately and repetitionally energized and deenergized in accordance with the frequency of the frequency signal outputted from the power amplifier 11, a plunger 13 responds to the energization and deenergization of the solenoid coil 12 to vibrate reciprocatively in the longitudinally direction with a stroke within a range delimited by a spring force of a spring 14 to thereby apply a vibration exciting force to the belt 3, and a pressure sensor 15 mounted at a tip end of the plunger 13 so as to bear against the belt 3. The pressure sensor 15 is subjected to a repulsion from the belt 3 during vibration thereof. Thus, the pressure applied to the belt 3 is detected by the sensor 15. It can readily be appreciated that the pressure sensed by the pressure sensor 15 varies or changes in dependence on the amplitude of vibration of the belt 3. Parenthetically, the pressure sensor 15 may be constituted by an element for converting a pressure to a corresponding voltage signal such as a piezoelectric sensor element.

The output signal of the pressure sensor 15 is fed back to the signal generator 10 via wiring 16. With the feedback of the output signal of the pressure sensor 15, it is possible to detect discriminatively and definitely the signal frequency outputted from the pressure sensor 15 upon occurrence of resonance of the belt 3. To this end, the signal frequency generated by the signal generator 10 upon detection of the resonance of the belt 3 is inputted to a microcomputer incorporated in a tester 18 which is generally provided for the motor vehicle for the purpose of diagnosing operation of the motor vehicle or internal combustion engine system thereof as to occurrence of abnormality or fault, wherein the microcomputer is so programmed to arithmetically determine the tension T of the belt 3 on the basis of the resonance signal frequency as inputted in accordance with the expression (1) mentioned hereinbefore.

Description will now be directed to operation of the belt tension measuring apparatus according to the instant embodiment of the invention. The solenoid-type transducer SV is stationarily disposed at a fixed position in the close vicinity to the belt 3 for applying a vibration of very small amplitude to the belt 3, wherein the position mentioned above is so selected that the plunger 13 is brought into contact with the belt 3 through the medium of the pressure sensor 15 interposed therebetween under a low contact pressure determined beforehand. In order to cause the plunger 13 to apply a vibration exciting frequency to the belt 3 with a continuously variable vibration exciting periodicity, the output signal of the signal generator 10 is supplied to the solenoid coil 12 with a continuously varying frequency or at a corresponding exciting periodicity. In this conjunction, the range within which the frequency of the oscillation signal generated by the signal generator 10 is allowed to vary continuously is defined by a lower limit frequency value $f_1$ and a upper limit frequency value $f_2$, as is illustrated in an amplitude-versus-frequency characteristic diagram of FIG. 2. The aforementioned frequency range may be experimentally determined beforehand so that the resonance vibration frequency of the belt of concern can be covered.

The oscillation signal outputted from the signal generator 10 is applied to the solenoid coil 12 of the solenoid-type transducer SV by way of the harness 17 after having been amplified by the power amplifier 11. The solenoid coil 12 is then alternately energized and deenergized repetitionally in accordance with the frequency of the signal applied thereto, to thereby cause the plunger 13 to vibratively reciprocate relative to the belt 3 within a range of stroke limited by the spring force of the spring 14.

In this manner, the plunger 13 applies to the belt 3 the vibration exciting force of a small amplitude via the pressure sensor 15 with the vibration exciting frequency being varied continuously. In the course of increasing gradually the vibration exciting frequency from the lower limit frequency value $f_1$ to the upper limit frequency value $f_2$, as illustrated in FIG. 2, the vibration amplitude of the belt 3 will exhibit a remarkable and steep increase at a resonance frequency $f_R$ at which resonance of the belt 3 takes place on the condition that such resonance frequency $f_R$ exists in the frequency range limited by the lower and upper frequencies $f_1$ and $f_2$, as shown in FIG. 2. Such resonating state of the belt 3 occurs when the vibration exciting frequency coincides with the resonance vibration frequency (characteristic or proper frequency, to say in another way) of the belt 3.

The pressure sensor 15 detects the pressures corresponding to the vibration amplitudes under repulsion of the belt 3 vibrating at the frequency within the range of the lower limit frequency value $f_1$ to the upper limit frequency value $f_2$, wherein the output signal of the pressure sensor 15 is fed back to the signal generator 10 via the harness 16. When the belt 3 enters the resonance state at a predetermined vibration exciting frequency $f_R$ (resonance frequency) with the vibration amplitude varying steeply and remarkably, the resonance frequency $f_R$ is read out as the resonance vibration frequency f of the belt from the pressure detecting signal fed back from the pressure sensor 15 to the signal generator 10.

The signal frequency $f_R$ as read out is inputted to a microcomputer which is incorporated in the tester 18 and programmed to arithmetically determine the tension T of the belt 3 on the basis of the resonance or natural frequency in accordance with the expression (1) mentioned previously. The microcomputer thus serves also as the belt tension arithmetic means. In this way, the tension T of the belt 3 can be measured with high reproducibility or consistency without being influenced by the manner of applying the vibration to the belt 3, differing from the conventional apparatuses described hereinbefore.

In this conjunction, it is to be mentioned that the signal generator 10 may be so arranged as to stop an oscillation frequency sweeping function in response to the pressure detecting signal fed back from the pressure sensor 15 upon occurrence of resonance in the belt 3 to thereby fix the oscillation frequency at the resonance frequency for facilitating identification of the resonance vibration frequency of the belt 3.

As is apparent from the foregoing description, according to the teachings of the present invention incarnated in the illustrated embodiment, it is possible to measure the resonance vibration frequency of the belt 3 simply by reading the frequency (resonance frequency) at which the vibration amplitude of the belt increases or varies steeply and significantly by virtue of such arrangement that the belt is excited to the vibrating state by applying the vibration exciting force whose frequency can continuously be varied, instead of applying a single shot of pulse-like force. Consequently, the tension of the belt can be measured with high accuracy without being influenced by the manner for applying the vibration exciting force to the belt, as in the case of the hitherto known belt tension measuring apparatuses described hereinbefore. Besides, the data of the measurement can be reproduced without any appreciable variance from one to another measurement, whereby reliability of the belt tension measurement can significantly be enhanced. Thus, the invention has provided an improved belt tension measuring apparatus which can enjoy high accuracy and reliability of the measurement of the tension being applied to the belt.

Embodiment 2

Figure 3:
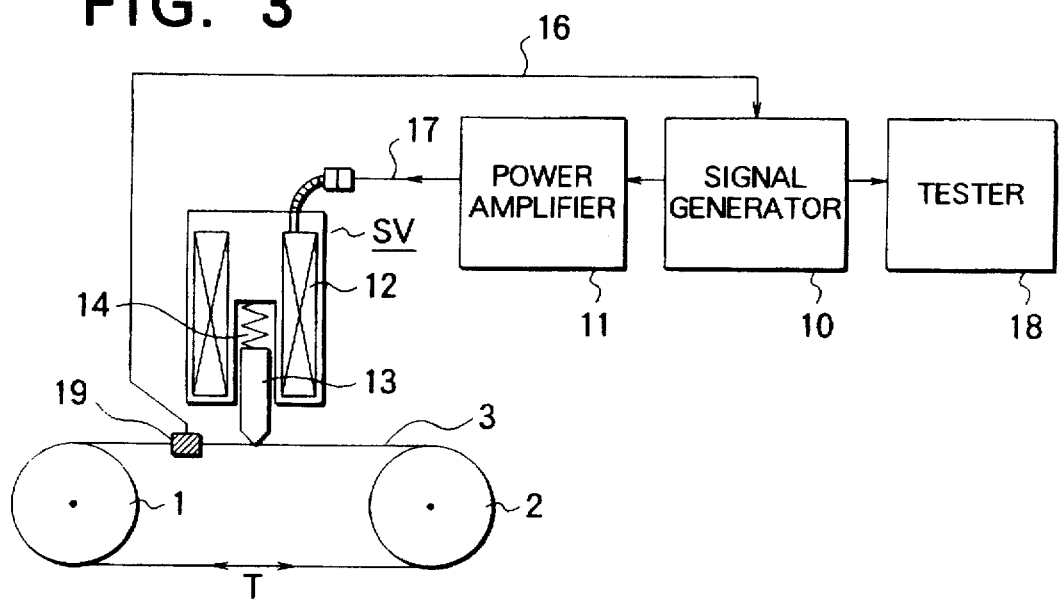
FIG. 3 is a schematic diagram showing a general arrangement of a belt tension measuring apparatus according to another embodiment of the present invention.

In the case of the belt tension measuring apparatus described above, the sensor 15 is mounted on the tip end of the plunger 13. However, instead of such arrangement, an acceleration sensor 19 may be clamped directly to the belt 3, as shown in FIG. 3, so long as the acceleration sensor element 19 has a sufficiently low mass which does not affect the resonance vibration frequency of the belt 3. A second embodiment of the present invention is directed to a belt tension measuring apparatus in which the vibration of the belt 3 is detected by means of such acceleration sensor 19 which is clamped directly to the belt 3. Parenthetically, the acceleration sensor 19 is designed to output a signal representative of a restoring force F of the belt 3 which is determined by acceleration of vibration and known per se in the art.

In operation of the belt tension measuring apparatus according to the instant embodiment of the invention, when resonance occurs in the belt 3, the vibration amplitude increases steeply and unordinarily, whereby acceleration of the vibration of the belt 3 increases correspondingly, as a result of which the acceleration sensor 19 outputs a signal of higher level or greater amplitude as compared with the signal generated in the non-resonating state. Accordingly, the signal generator 10 may be so implemented as to extract the signal frequency of the high-level signal fed back from the acceleration sensor 19 as the resonance vibration frequency of the belt 3 with the output signal thereof indicative of the resonance vibration frequency being supplied to the tester 18.

Embodiment 3

As pointed out previously, it is undesirable that the vibration sensor clamped directly to the belt 3 affects the resonance vibration frequency thereof. Thus, it is proposed according to a third embodiment of the invention to detect the vibration of the belt 3 by using a sensor disposed contactless in the close vicinity to the belt 3. To this end, a transducer such as, for example, a microphone may be used for detecting the vibration amplitude level in terms of variation or change in the sound pressure level. In that case, the transducer should be disposed at a position most suitable for detecting the vibration amplitude of the belt 3. Such position may be determined experimentally.

Embodiment 4

In the belt tension measuring apparatuses according to the preceding embodiments, the exciting mechanism for applying vibration to the belt 3 is realized by the solenoid-type transducer SV having the reciprocative plunger which is directly in contact with the belt 3. According to the instant embodiment of the invention, it is proposed to use a vibration exciting mechanism which can apply the exciting force to the belt 3 in a contactless manner.

As the vibration exciting mechanism to this end, there may be mentioned such a mechanism for applying high-pressure air jets to the belt 3 intermittently and periodically via a flexible pipe. More specifically, by making variable continuously the time interval or frequency at which the high-pressure air jet is applied to the belt 3, the exciting frequency can be made to be continuously variable in such a manner as illustrated in FIG. 2. In that case, the pressure sensor may be positioned either in contact with the belt 3 or contactless. This arrangement is advantageous in that the vibration exciting force can be applied to the belt 3 without being interfered by devices and instruments installed peripherally of the belt 3.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the belt tension measuring apparatus for the belt spanned between pulleys such as those of a belt/pulley transmission interposed between a crank shaft and a cam shaft of an internal combustion engine for a motor vehicle, it goes without saying that the invention can be applied to measurement of tensions of various other belts such as conveyor belts or the like where measurement of tension of the belt in general is desirable. Accordingly, the means for arithmetically determining the tension of the belt on the basis of the output signal of the sensor is never limited to the microcomputer incorporated in the motor vehicle diagnosis tester, but other microcomputer dedicated to this end may be employed. Furthermore, application of the exciting vibration to the belt can be realized by using an ultrasonic sensor installed contactless or in contact with the belt.

Accordingly, all suitable modifications and equivalents may be resorted to, falling within the spirit and scope of the invention.

What is claimed is:

1. An apparatus for measuring a tension of a belt in a state spanned under tension, comprising:

vibration applying means for applying vibration to said belt with a frequency varying within a predetermined frequency range that covers a resonance vibration frequency of said belt, wherein said predetermined frequency range is defined by a first predetermined frequency and a second predetermined frequency, and wherein said vibration applying means applies said vibration to said belt having said first predetermined frequency and incrementally changes said frequency of said vibration such that said frequency approaches said second predetermined frequency;

vibration amplitude detecting means for detecting an amplitude of said vibration of said belt and for outputting a corresponding amplitude signal; and tension determining means for detecting an occurrence of resonance of said belt based on said amplitude signal output from said vibration amplitude detecting means, for identifying said resonance vibration frequency of said belt when said resonance occurs, and for determining said tension of said belt based on said resonance vibration frequency.

2. A belt tension measuring apparatus according to claim 1, wherein said tension of said belt is determined on the basis of said resonance vibration frequency in accordance with:

$$T = K \cdot S^2 \times M \times f^2$$

where

K represents a constant,

S represents a span length of said belt,

M represents a unit weight or mass of said belt, and f represents said resonance vibration frequency of the belt.

3. A belt tension measuring apparatus according to claim 1, wherein said vibration applying means comprises:

signal generating means for generating an oscillation signal having an oscillation frequency, wherein said oscillation frequency is varied within said predetermined frequency range; and vibration exciting means, driven by said oscillation signal, for applying said vibration, which has said frequency varying continuously within said predetermined frequency range, to said belt, wherein said tension determining means detects said occurrence of said resonance of said belt when said amplitude signal changes steeply.

4. A belt tension measuring apparatus according to claim 3, wherein said tension determining means identifies said oscillation frequency of said oscillation signal output from said signal generating means at a time point when said amplitude signal changes steeply at said resonance vibration frequency of said belt.

5. A belt tension measuring apparatus according to claim 3, wherein said vibration exciting means comprises:

a transducer for converting said oscillation signal output from said signal generating means into mechanical vibration having a mechanical vibration frequency corresponding to said oscillation frequency of said oscillation signal; and a vibration transmitting member which is disposed in physical contact with said belt and which applies said mechanical vibration to said belt.

6. A belt tension measuring apparatus according to claim 3, wherein said vibration exciting means comprises:

a transducer for converting said oscillation signal output from said signal generating means into mechanical vibration having a mechanical vibration frequency corresponding to said oscillation frequency of said oscillation signal; and a vibration transmission member which is not in physical contact with said belt and which applies said mechanical vibration to said belt.

7. A belt tension measuring apparatus according to claim 5, wherein said vibration transmission member comprises a pressure sensor which also serves as said vibration amplitude detecting means.

8. A belt tension measuring apparatus according to claim 1, wherein said vibration amplitude detecting means includes a pressure sensor element which is positioned in contact with said belt.

9. A belt tension measuring apparatus according to claim 1, wherein said vibration amplitude detecting means include a sensor element which is not positioned in contact with said belt.

10. A belt tension measuring apparatus according to claim 1, wherein said vibration amplitude detecting means comprises a vibration acceleration sensor clamped to said belt for detecting acceleration of vibration of said belt.

11. A belt tension measuring apparatus according to claim 3, wherein said vibration exciting means comprises pneumatic means for applying air streams to said belt at a predetermined time interval periodically with a variable frequency.

12. A belt tension measuring apparatus according to claim 1, wherein said amplitude signal of said vibration amplitude detecting means is fed back to said vibration applying means for sustaining said vibration of said belt constant at said resonance frequency.

13. A belt tension measuring apparatus according to claim 1, wherein said vibration applying means comprises:

a variable frequency signal generator which outputs an oscillation signal having a variable frequency;

an electromagnetic transducer which has a plunger, which converts said oscillation signal output from said variable frequency signal generator into a mechanical vibration, and which transmits said mechanical vibration to said belt via said plunger, wherein said plunger is disposed within said electromagnetic transducer and reciprocatively moves in response to said oscillation signal and wherein a stroke of said plunger is delimited by a spring; and a pressure sensor mounted at a tip end of said plunger which contacts said belt and applies said mechanical vibration to said belt, and wherein said vibration amplitude detecting means comprises said pressure sensor which detects said amplitude of said vibration of said belt and outputs said amplitude signal having an amplitude which varies in accordance with a magnitude of said amplitude of said vibration of said belt.

14. A method of measuring a tension of a belt in a state spanned under tension, comprising the steps of:

applying vibration to said belt having a frequency varying within a predetermined frequency range, wherein said predetermined frequency range covers a resonance vibration frequency of said belt wherein said predetermined frequency range is defined by a first predetermined frequency and a second predetermined frequency, and wherein said vibration is applied to said belt such that said vibration has said first predetermined frequency and that said frequency of said vibration incrementally changes so as to approach said second predetermined frequency;

detecting an amplitude of said vibration of said belt and outputting a corresponding amplitude signal;

detecting an occurrence of resonance of said belt based on said detected amplitude;

identifying said resonance vibration frequency of said belt when said resonance occurs; and determining said tension of said belt based on said resonance vibration frequency.

15. A belt tension measuring method according to claim 14, wherein said tension of said belt is determined on the basis of said resonance vibration frequency in accordance with:

$$T = K \cdot S^2 \times M \times f^2$$

where

K represents a constant,

S represents a span length of said belt,

M represents a unit weight or mass of said belt, and f represents said resonance vibration frequency of the belt.

16. A belt tension measuring apparatus according to claim 5, wherein said vibration amplitude detecting means includes a sensor element which is not positioned in contact with said belt.

17. A belt tension measuring apparatus according to claim 6, wherein said vibration amplitude detecting means includes a sensor element which is not positioned in contact with said belt.

18. A belt tension measuring apparatus according to claim 1, wherein said vibration applying means comprises pneumatic means for applying air streams to said belt at a predetermined time interval periodically with a variable frequency.

19. A belt tension measuring apparatus according to claim 1, wherein said first predetermined frequency is a lower limit of said predetermined frequency range and said second predetermined frequency is an upper limit of said predetermined frequency range.

20. A belt tension measuring apparatus according to claim 1, wherein said first predetermined frequency does not equal said resonance vibration frequency.

21. A belt tension measuring apparatus according to claim 20, wherein said second predetermined frequency does not equal said resonance vibration frequency.

22. A belt tension measuring apparatus according to claim 1, wherein said vibration applying means incrementally changes said frequency of said vibration in accordance with predetermined increments.

* * * * *